United States Patent [19]

McGunigle

[11] 3,820,393
[45] June 28, 1974

[54] SIGNAL VELOCITY MEASUREMENT SYSTEM
[76] Inventor: Richard D. McGunigle, 632 Lemon Hill Ter., Fullerton, Calif.
[22] Filed: Dec. 9, 1970
[21] Appl. No.: 96,511

[52] U.S. Cl. .............................................. 73/204
[51] Int. Cl. ............................................ G01p 5/10
[58] Field of Search ............ 73/194, 204; 324/77 G; 235/151.34, 181

[56] References Cited
UNITED STATES PATENTS
3,019,647   2/1962   Beard et al. ............................. 73/204
3,558,898   1/1971   Block et al. ............................ 235/181

OTHER PUBLICATIONS
Hewlett–Packard, Journal, November 1969, Vol. 21, No. 3, pgs. 1–4 and 19.

Primary Examiner—Richard C. Queisser
Assistant Examiner—Herbert Goldstein
Attorney, Agent, or Firm—Nilsson, Robbins & Berliner

[57] ABSTRACT

A correlation system for measuring the velocity of a signal. The principles are applicable to measure the time of flight of any signal. In a specific embodiment, a flowmeter for a fluid stream is described which measures the time of flight of a thermal pulse by correlation of generating and sensing signals. A heater pulse triggers a pulse of controllable duration which controls the polarity of an amplifier connected to a thermal sensor and whose integrated product is utilized to vary the duration of the positive pulse until a null average output is achieved. The control voltage drives a slave multivibrator, the integrated output of which is linearly related to flow and directly indicates the rate of flow of the fluid.

8 Claims, 4 Drawing Figures

PATENTED JUN 28 1974 3,820,393

INVENTOR.
RICHARD D. McGUNIGLE
BY
NILSSON ROBBINS WILLS & BERLINER
ATTORNEYS

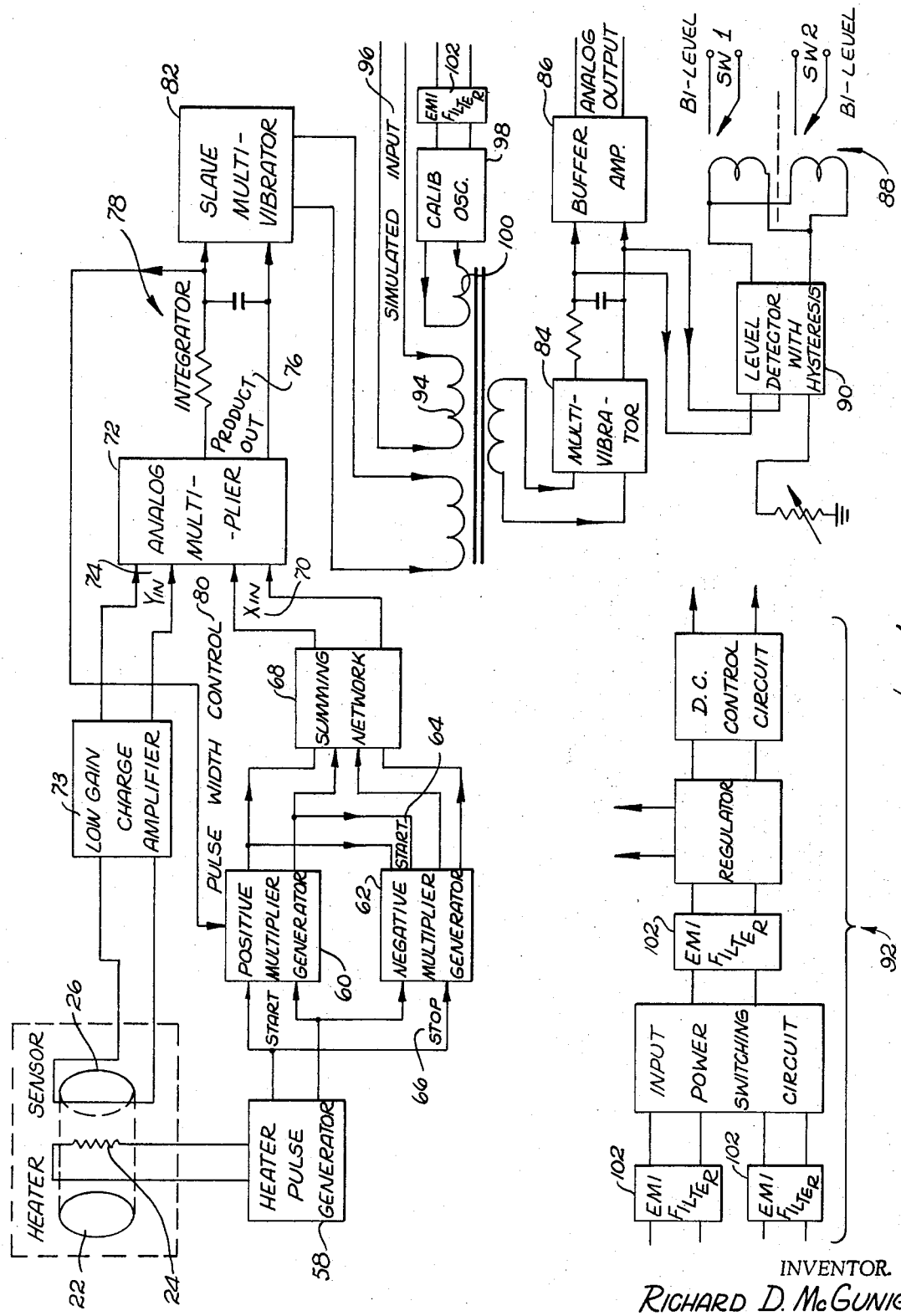

SIGNAL VELOCITY MEASUREMENT SYSTEM

FIELD OF THE INVENTION

The field of art to which the invention pertains includes the field of fluid flowmeters, particularly of the thermal type.

BACKGROUND AND SUMMARY OF THE INVENTION

The measurement of velocity of a signal in a fluid can be accomplished by a variety of mechanical and/or electrical methods. When the measurement is made so as to intermittently determine fluid flow under the gravityless conditions of the vacuum exposed confines of an orbiting satellite, the normal criteria for flowmeter operation are generally inadequate. It would be desirable to utilize a system which does not incorporate moving parts and which is sufficiently small to be readily adapted to the size limitations encountered in space vehicles. A prior art method of measuring fluid flow which does not require moving parts is the thermal pulse method. This method involves heating the fluid for a short period of time as it passes a particular point in a conduit and monitoring the fluid downstream from the point of heating so as to detect the passage of the heated volume of fluid. The distance of these points divided by the time-of-flight of the heated fluid volume is equal to the fluid velocity. In a carefully controlled environment, this concept works very well. However, in the rigors of space a variety of factors operate against use of such a method. Thus, the input power available to create a heated slug of fluid is minimal and space limitations preclude an optimum geometry. Furthermore, the fluid flow may have large thermal fluctuations as background. All of these factors make it difficult to achieve stable operation in orbit for extended time periods.

The present invention is directed to a system for measuring the velocity of a signal. In particular, it utilizes correlation techniques applicable to measure the time of flight of any signal. In a specific embodiment, the invention relates to a flowmeter and utilizes, in part, the concept of a thermal pulse flowmeter, but does not suffer from the aforementioned drawbacks. The time-of-flight of a thermal pulse is measured, but heater power can be very low and the components can be extremely small. Fluid flow can be continuously measured and background thermal noise can be averaged out in a few cycles of operation. Since a thermal pulse method is used, linear velocity is measured independently of fluid characteristics.

The present invention measures the time-of-flight of a thermal pulse by correlating a signal generated in representation of the thermal pulse with a signal generated by a thermal sensor downstream a predetermined distance from the point of generation of the first signal. Specifically, a system is provided which is clocked to a heater which generates the thermal pulse. Activation of the heater triggers a pulse of controllable duration which controls the polarity of an amplifier connected to a thermal sensor. The integrated output of the amplifier is applied to a multivibrator to generate a waveform having a period proportional to the first pulse duration and linearly related to fluid flow.

Although the invention will be described with specific reference to a flowmeter utilizing correlated thermal pulses, it has broad application to measure the time of flight of any signal. For example, the principles can be applied to obtain ambient temperature data in an ocean by measuring the time of flight of an ultrasonic signal. Similarly, the principles can be applied to ionization flowmeters.

BRIEF DESCRIPTION OF THE DRAWINGS

FIG. 4 is a block diagram of electrical circuitry of the flowmeter.

DETAILED DESCRIPTION

Figure 1:
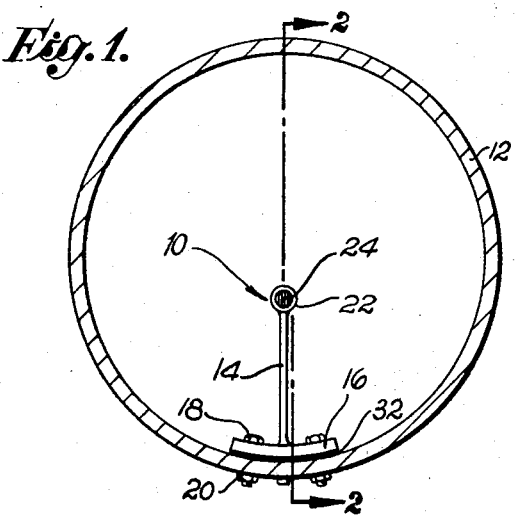
FIG. 1 is a cross-sectional view of a conduit in which a flowmeter of this invention is incorporated.
Figure 2:
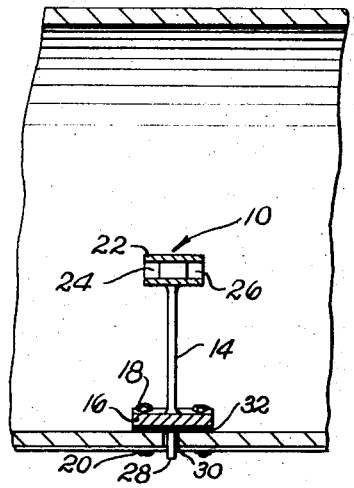
FIG. 2 is a view taken on line 2—2 of FIG. 1 in the direction of the arrows.

Referring to FIGS. 1 and 2, there is illustrated one manner in which a transducer 10 incorporating principles of this invention can be mounted internally of a conduit 12 through which there is a flow of fluid to be measured. The transducer 10 is mounted atop a post 14 extending from a base plate 16 which is curved to conform to the inner curvature of the conduit 12. Mounting bolts 18 and nuts 20 secure the base plate 16 to the conduit 12 wall so that the transducer 10 extends into the conduit in the path of the fluid flow. The transducer 10 is in the form of a hollow tube 22 in which a heater grid 24 is located near the input end and a thermal pulse sensor 26 is located near the output end. Electrical wiring (not shown) is fed from the heater grid and sensor through the post 14 and into a connector member 28 which extends from the base plate 16 through an opening 30 defined through the conduit 12 wall and which is sealed against fluid leakage by means of a gasket 32.

The transducer 10 operates by measuring the time delay between the generation of a thermal pulse at the heater grid 24 and its detection downstream at the sensor 26. By using a correlation technique, the system is independent of random fluctuations in temperature and is thus inherently accurate, depending only upon a precise knowledge of the distance between the heater grid 24 and sensor 26 and upon measurement of the time-of-flight of the thermal pulse.

Reference can be made to the specific structural details for purposes of illustrating the invention. However, it is to be understood that such details merely exemplify the invention which may take many different forms which are radically different from the illustrative embodiment. A transducer 10 can be utilized in which the tube 22 has an inside diameter of 5/16 of an inch and is supported within a 12 inch diameter conduit 12 so as to extend therein about 5 inches. In this embodiment, the flow range of interest is from about 70 to about 700 cubic feet per minute which in the 12 inch diameter conduit 12 relates to a linear flow of about 89 to 890 feet per minute. A heater 24 to sensor 26 spacing of 1.2 inches is utilized so that the low flow rate takes 60 microseconds and the high flow rate takes 6 microseconds to traverse this distance. The heater grid 24 is constructed of a matrix of Chromel-A ribbons (Hoskins Manufacturing Co.), 0.002 × 0.015 inches, edgewise to the flow. The sensor 26 is constructed of pyroelectric ceramic, 0.005 × 0.015 inches, edgewise to the flow, which is self-generating and provides an output voltage proportional to the rate of change of temperature and is applied to an amplifier.

In operation, the heater grid 24 receives a 10 microsecond pulse which heats it to about 20°F above ambient. With air as the fluid, a thermal pulse is generated at about 4°F above ambient for a flow of 890 feet/minute and approaching 20°F above ambient for a flow of 89 feet/second. The power required to cause this temperature rise is less than 10 watts, averaging less than one watt over a duty cycle of 10 − 1. The thermal time constant of the sensor 26 is about one second, therefore, the response of the sensor 26 to the 10 microsecond pulse is down −40 db from its steady state response. However, the steady state response is so high that the resulting signal is still more than sufficient for detection purposes.

As noted, a correlation technique can be utilized to detect the time-of-flight of the thermal pulse so as to eliminate the effect of temperature fluctuations. Such a technique correlates waveforms by dividing the waveforms into short time intervals and multiplying the corresponding increments together. One waveform can represent the thermal pulse at its point of generation while the other waveform can be generated by a sensor located downstream. A time shift can be employed to maximize the average product. Peak correlation can thus be measured and related to the time shift which is a direct indication of the time-of-flight of the thermal pulse. In the broader sense of the present invention, both waveforms can be obtained by means of sensors and cross-correlation of natural variations in the local temperature of the fluid at two points. The time shift provides the maximum time-correlation and directly indicates the velocity of flow. Such procedures require a large capability for information storage and handling. The embodiment exemplified by FIGS. 1 and 2 provides practical simplifications of such a time-shift cross-correlation technique.

Figure 3:
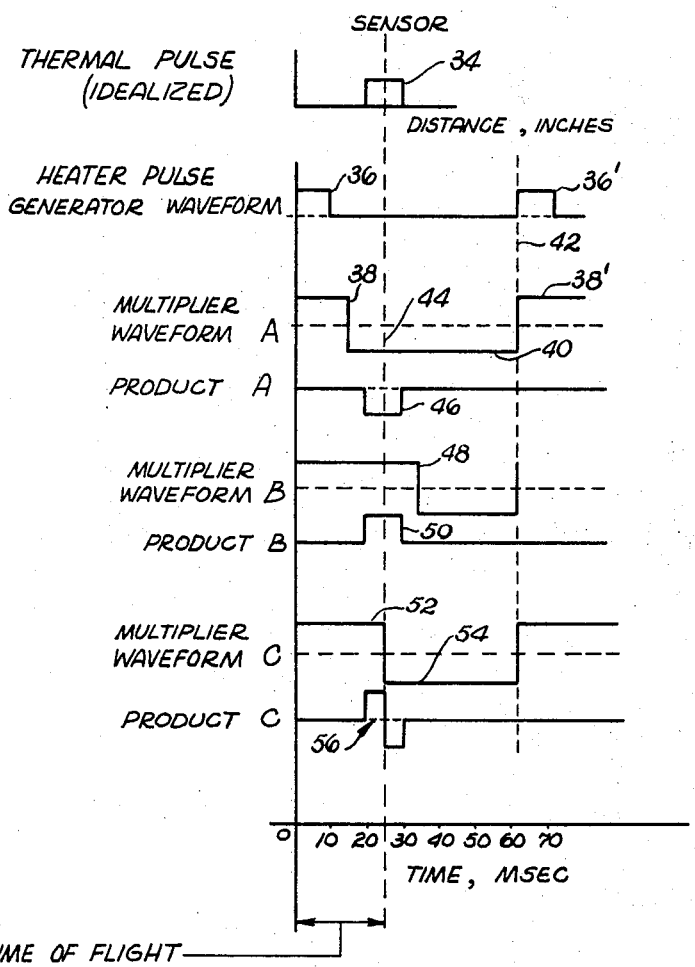
FIG. 3 is a diagram schematically depicting the relationship between flowmeter geometry and waveform configuration.

Operation of the embodiments of FIGS. 1 and 2 can be illustrated by reference to FIG. 3. In this illustration, a fluid flow rate of 240 feet per minute is to be measured utilizing a transducer 10 in which the distance from the heater grid 24 to the sensor 26 is 1.2 inches. Accordingly, the time of flight of a thermal pulse generated by the heater grid 24 to reach the sensor 26 is 25 microseconds.

The entire system is clocked to the heater pulses. Heater pulses of 10 microsecond duration are transmitted to the transducer heater grid 24 resulting in a thermal pulse schematically illustrated in FIG. 3 at 34. The thermal pulse 34 is shown in idealized form and after having traveled from its point of generation to the sensor, 1.2 inches distance (in actuality the shape of the pulse would depend upon the time constant of the grid 24 and the rapidity of the pulses). Under the criteria of time of flight of a thermal pulse of 240 feet per minute, the distance scale graphically indicating the position of the sensed thermal pulse 34 is aligned with the time scale for other generated waveforms as will hereinafter be described. Thus, under the conditions set forth, distance can be converted to time for purposes of illustrating the relationships between the sensed pulse and other generated pulses.

The 10 microsecond heater pulse waveform which gives rise to the thermal pulse 34 is indicated at 36 along with a successive pulse 36' which is generated after a duration of time which is sufficient to allow the thermal pulse 34 to travel to the sensor, in this case a duration somewhat in excess of 60 microseconds. The heater pulse 36 triggers the start of a positive one-shot multivibrator to generate a square positive pulse 38. The width of the positive pulse 38 is varied by a control signal, as will hereinafter be described. The end of the positive pulse 38 triggers the start of a negative waveform generator which yields a pulse 40 which, in turn, is terminated by the start of the next heater pulse 36', as indicated by the dashed line 42, resulting in a successive positive pulse 38'. The positive and negative pulses 38 and 40 are summed resulting in a combined multiplier waveform, A which is applied to the X input of an analog multiplier.

Meanwhile, the sensor 26 output is amplified and fed to the Y input of the multiplier. In the present illustration, the multiplier waveform A is such that the sensor pulse (as represented by the thermal pulse 34) arrives after the end of the positive pulse portion 38 of the waveform A, as indicated by the dashed line 44. Accordingly, the long term average product of the multiplier is negative, as indicated at 46, for multiplier product A.

Referring to multiplier waveform B, the situation is illustrated wherein the sensor pulse 34 arrives before the end of the positive multiplier portion 48 of the waveform B. In this case, the long term average product B will be positive, as indicated at 50.

The output of the multiplier is integrated to provide a long (compared to one cycle) averaging time, and is used to control the duration of the positive portion of the multiplier waveform. This is accomplished by a circuit arrangement in which a positive multiplier output, such as 50, shortens the duration of the positive pulse while a negative multiplier output, such as 46, lengthens the duration of the positive pulse. As indicated with respect to waveform C and product C in FIG. 3, when the positive pulse length 52 is effectively equal to the time of flight of the thermal pulse 34 from the heater 24 to the sensor 26, the sensor output is multiplied equally by the positive 52 and the negative 54 multiplier waveform portions and will indicate a null multiplier average output, as indicated at 56. While FIG. 3 schematically shows the pulse length 52 as equal to the time of flight plus one-half the pulse width of the thermal pulse 34, the effect of the time constant of the grid 24, as above referred to results in a compensating time lag. The network parameters are, of course, chosen to accommodate this as well as any other outphase.

Referring now to the block diagram of FIG. 4, the manner of operation of the present invention with respect to a specific type of circuit is illustrated. A heater pulse generator 58 is used to actuate the heater 24 which triggers the start of a positive multiplier generator 60 to generate a positive pulse of controllable width. Termination of the positive multiplier pulse triggers the start of the negative multiplier waveform generator 62 as indicated at 64, which is terminated by the start of the succeeding heater pulse, as indicated at 66. The two multiplier waveforms are applied to a summing network 68 resulting in a combined multiplier waveform which is applied to the X input, indicated at 70 of the analog multiplier 72. The sensor 26 output is applied to a low gain charge amplifier 73 which is connected to the Y input, indicated at 74, of the analog multiplier 72. The product output 76 is integrated as indicated at 78 and fed back to the positive multiplier generator 60 as a pulse width control 80 as hereinbefore described.

The control voltage which varies the positive pulse length is also used to control the pulse length of a slave multivibrator 82 which generates a waveform with a period proportional to the positive pulse length. The integrated output of the slave multivibrator 82 is linearly related to flow of the fluid to be measured. Thus, V out = $K_1$ × Frequency
Frequency = $K_2/T$
T is T positive pulse (sec) = Distance (heater-sensor), ft./Velocity of flow,ft/sec.
Therefore, V out = $K_1K_2/T = K_1K_2$ · Flow Velocity/Distance
V out = K · Flow Velocity The slave multivibrator 82 output is transformer coupled via a multivibrator 84 to a buffer output amplifier 86. A bi-level switching circuit 88 is connected to the multivibrator 84 output via a lever detector with fixed hysteresis 90, prior to the buffer amplifier 86 so as to eliminate the effect of output loading of the set point. The entire system is powered through a filtered regulator circuit 92.

An independent transformer winding 94 is available for asimulation frequency, indicated at 96, as may be required to readjust the bi-level output set point. Additionally, an independent calibrating oscillator 98 can be utilized to provide an additional frequency to another independent transformer winding 100 to provide both an analog checkout voltage and bi-level switch function. EMI filters can be applied as required, as shown.

Particular circuit components have been illustrated for purposes of disclosing a specific embodiment. However, it will be appreciated that this embodiment merely exemplifies the invention which may take many forms substantially different from the specific illustrative embodiment disclosed. Therefore, specific structural and functional details are not to be interpreted as limiting, but merely as a basis for the claims. In this regard, while positive and negative multiplier generators, a summary network and analog multiplier have been disclosed, they may be replaced with any equivalent circuitry. For example one may utilize the heater pulse generator 58 to trigger a positive pulse of controllable duration which controls the polarity of a gain-of-one bi-polar amplifier connected to the heater sensor 26. When the pulse is present, the gain is +1, and when absent, the gain is −1. The integrated output of the amplifier can be used to vary the duration of the delay until the null output is achieved.

I claim:

1. A velocity measurement system for indicating the time of flight of a fluid-carried signal, comprising
    means for applying a thermal pulse to said fluid, as said fluid-carried signal, at a first location of said fluid and generating in association therewith a first electrical pulse of predetermined polarity and of a duration controllable by voltage applied thereto;
    means for sensing said fluid-carried signal at a location downstream from said first location and generating an electrical pulse as a signal thereof;
    means for generating an output voltage signal when said signal pulse is present, said voltage signal having a first polarity when said first electrical pulse has said predetermined polarity and having a polarity opposite said first polarity when said first electrical signal is not of said predetermined polarity;

means for integrating said output voltage signal and applying said integrated output voltage to said voltage controllable means to thereby control the duration of said first electrical pulse to effect a null integrated output voltage signal; and
    means for determining the duration of said first electrical pulse and generating therefrom an information signal as a function of time of travel of said fluid-carried signal from said first location to said downstream location.

2. The invention according to claim 1 in which said means for generating said output voltage signal further comprises:
    means for generating a further electrical pulse of opposite polarity to said first pulse upon termination of said first pulse;
    means for summing said first and further pulses to generate a summing voltage therefrom;
    a voltage multiplier;
    means for applying said summing voltage to said voltage multiplier; and
    means for applying said signal pulse to said voltage multiplier.

3. The invention according to claim 2 in which said fluid-carried signal generating means comprises means for generating a plurality of said fluid-carried signals, each initiating an operating cycle, said integrating means constituting means for integrating the output of said voltage multiplier over a plurality of said operating cycles.

4. The invention according to claim 3 including means for terminating the second pulse of each cycle upon generation of a succeeding fluid-carried signal.

5. A method for indicating the rate of flow of fluid in a stream by measuring the time of flight of a fluid-carried signal therein, comprising:
    applying a thermal pulse to said fluid as said fluid-carried signal, at a first location of said fluid and in association therewith generating a first electrical pulse of predetermined polarity and of a voltage-controllable duration;
    sensing said fluid-carried signal at a location downstream from said first location and generating an electrical pulse as a signal thereof;
    generating an output voltage signal when said signal pulse is present, said voltage signal having a first polarity when said first electrical pulse has said predetermined polarity and having a polarity opposite said first polarity when said first electrical signal is not of said predetermined polarity;
    integrating said output voltage signal and controlling the duration of said first electrical pulse with said integrated output voltage signal to effect a null integrated output voltage signal; and
    determining the duration of said first electrical pulse and generating therefrom an information signal as a function of time of travel of said fluid-carried signal from said first location to said downstream location.

6. The invention according to claim 5 in which said step of generating said output voltage signal further comprises:

generating a further electrical pulse of opposite polarity to said first pulse upon termination of said first pulse;

summing said first and further pulses to generate a summing voltage therefrom; and multiplying said summing voltage and said signal pulse to generate an output voltage signal.

7. The invention according to claim 6 in which a plurality of fluid-carried signals are generated, each initiating an operating cycle, said integrating step constituting a step of integrating the product of said multiplying step over a plurality of said operating cycles.

8. The invention according to claim 7 including the step of termination the second pulse of each cycle upon generation of a succeeding fluid-carried signal.

* * * * *